United States Patent
Khan et al.

(10) Patent No.: US 10,033,769 B2
(45) Date of Patent: Jul. 24, 2018

(54) LAWFUL INTERCEPTION IN A WI-FI/PACKET CORE NETWORK ACCESS

(71) Applicant: Telefonaktiebolaget LM Ericsson (publ), Stockholm (SE)

(72) Inventors: Akbar Khan, Herzogenrath (DE); Jade Mansour, Paris (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 174 days.

(21) Appl. No.: 15/024,586

(22) PCT Filed: Sep. 27, 2013

(86) PCT No.: PCT/EP2013/070268
§ 371 (c)(1),
(2) Date: Mar. 24, 2016

(87) PCT Pub. No.: WO2015/043665
PCT Pub. Date: Apr. 2, 2015

(65) Prior Publication Data
US 2016/0241600 A1    Aug. 18, 2016

(51) Int. Cl.
*H04L 29/06*    (2006.01)
*H04L 29/12*    (2006.01)
*H04W 12/06*    (2009.01)
*H04W 12/02*    (2009.01)

(52) U.S. Cl.
CPC ........ *H04L 63/306* (2013.01); *H04L 61/6022* (2013.01); *H04L 61/6054* (2013.01);
(Continued)

(58) Field of Classification Search
CPC .............. H04L 63/306; H04L 61/6022; H04L 61/6054; H04L 63/123; H04L 61/1588;
(Continued)

(56) References Cited

U.S. PATENT DOCUMENTS

| | | | | |
|---|---|---|---|---|
| 8,219,811 | B2 * | 7/2012 | Roundtree | G06F 21/51 713/169 |
| 8,627,092 | B2 * | 1/2014 | Fischer | H04W 12/06 713/181 |
| 2006/0190996 | A1 * | 8/2006 | Korkishko | G06F 21/57 726/9 |

(Continued)

OTHER PUBLICATIONS

International Search Report and Written Opinion of the International Searching Authority, Application No. PCT/EP2013/070268, dated Jul. 17, 2014.

(Continued)

*Primary Examiner* — Jahangir Kabir
(74) *Attorney, Agent, or Firm* — Sage Patent Group

(57) ABSTRACT

A method, by an authentication unit of a wireless access network, allows anchoring of a data packet session of a user entity connected to the wireless access network to a packet core network of a mobile communications network. The user entity uses an access identifier for its identification in the wireless access network. The access identifier is not used in the mobile communications network to identify a subscriber. A request message is received in which access to the wireless access network is requested. The request message contains an MAC address of the requesting user entity. The MAC address is converted into a sequence of digits used as a mobile subscriber identifier with which the user entity is identified in the mobile communications network and a response message is transmitted accepting the access to the packet core network. The response message includes the sequence of digits used as mobile subscriber identifier.

18 Claims, 14 Drawing Sheets

(52) U.S. Cl.
CPC ........... *H04L 63/123* (2013.01); *H04W 12/02* (2013.01); *H04W 12/06* (2013.01); *H04L 61/1588* (2013.01); *H04L 61/2015* (2013.01); *H04L 61/605* (2013.01)

(58) Field of Classification Search
CPC .. H04L 61/605; H04L 61/2015; H04W 12/02; H04W 12/06
USPC .......................................................... 726/2–9
See application file for complete search history.

(56) References Cited

U.S. PATENT DOCUMENTS

| | | | |
|---|---|---|---|
| 2007/0014282 A1* | 1/2007 | Mitchell | G01S 5/0018 370/352 |
| 2010/0228967 A1* | 9/2010 | Hahn | H04W 12/06 713/155 |
| 2013/0288644 A1 | 10/2013 | Schroeder et al. | |
| 2014/0334446 A1* | 11/2014 | Lim | H04W 28/08 370/331 |
| 2015/0264051 A1* | 9/2015 | Hoggan | H04L 63/0892 726/1 |
| 2016/0255065 A1* | 9/2016 | Oshida | H04L 61/6022 726/3 |
| 2017/0257839 A1* | 9/2017 | Alles | G01S 5/0036 |

OTHER PUBLICATIONS

3GPP, Technical Specification—"3rd Generation Partnership Project; Technical Specification Group Core Network and Terminals; Numbering, addressing and identification (Release 12)", 3GPP TS 23.003 V12.0.0 (Sep. 2013), 84 pp.

3GPP, Technical Specification—"3rd Generation Partnership Project; Technical Specification Group Services and System Aspects; Architecture enhancements for non-3GPP accesses (Release 12)", 3GPP TS 23.402 V12.2.0 (Sep. 2013), 256 pp.

3GPP, Technical Specification—"3rd Generation Partnership Project; Technical Specification Group Core Network and Terminals; 3GPP system to Wireless Local Area Network (WLAN) interworking; Stage 3 (Release 9)", 3GPP TS 29.234 V9.4.1 (Jul. 2013), 97 pp.

3GPP, Technical Specification—"3rd Generation Partnership Project; Technical Specification Group Services and System Aspects; 3G security; Lawful interception architecture and functions (Release 12)", 3GPP TS 33.107 V12.4.0 (Sep. 2013), 153 pp.

3GPP, Technical Specification—"3rd Generation Partnership Project; Technical Specification Group Services and System Aspects; 3G security; Handover interface for Lawful Interception (LI) (Release 12)", 3GPP TS 33.108 V12.2.0 (Sep. 2013), 195 pp.

Aboba et al., "The Network Access Identifier", Network Working Group, Request for Comments: 4282, Category: Standards Track, Dec. 2005, 16 pp.

Anonymous, "IMSI number to MAC address—Convert C code to PHP", retrieved Jul. 9, 2014 from the Internet URL:http://www.techques.com/question/1-11306137/IMSI-number-to-MAC-address---Convert-C-code-to-PHP, Jul. 3, 2012, 5 pp.

IEEE Computer Society, "802®—IEEE Standard for Local and Metropolitan Area Networks: Overview and Architecture", IEEE Std 802®—2001, Mar. 8, 2002, 47 pp.

* cited by examiner

| IMSI | MCC | MNC | MSIN |
|---|---|---|---|
| Max Digits | 3 | 3 | 9 |
| Max Decimal | 999 | 999 | 999999999 |

| MSISDN | CC | NDC | SN |
|---|---|---|---|
| Max Digits | 3 | 12 | |
| Max Decimal | 999 | 999999999999 | |

| MAC | OUI | | NIC | | | |
|---|---|---|---|---|---|---|
| Max Bits | 8 | 8 | 8 | 8 | 8 | 8 |
| Max Hex. | FF | FF | FF | FF | FF | FF |
| Eq. Max Decimal | 255 | 255 | 255 | 255 | 255 | 255 |

FIG. 7

LAWFUL INTERCEPTION IN A WI-FI/PACKET CORE NETWORK ACCESS

CROSS REFERENCE TO RELATED APPLICATION

This application is a 35 U.S.C. § 371 national stage application of PCT International Application No. PCT/EP2013/070268, filed on Sep. 27, 2013, the disclosure and content of which is incorporated by reference herein in its entirety. The above-referenced PCT International Application was published in the English language as International Publication No. WO 2015/043665 A1 on Apr. 2, 2015.

TECHNICAL FIELD

The present invention relates to a method, by an authentication unit for a wireless access network, to allow anchoring of a data packet session of a user entity connected to the wireless access network to a packet core network of mobile communications network. The invention furthermore relates to an authentication unit configured to allow anchoring of the data packet session and to a lawful interception control module.

BACKGROUND

Lawful interception (LI) is a method to obtain, by a lawful authority, communication related data of a subscriber in a mobile communications network. Many countries in the world have lawful interception capability requirements making it possible to obtain communication data such as a signaling data, network management information or content related data of a subscriber or of a mobile user entity.

Furthermore, systems have been developed in which a WI-FI or WLAN access network is interacting with a mobile communications network and in this context, a Border Network Gateway, BNG, is used to provide a WLAN offload for a user, which means that a complementary network technology such as WLAN is used for delivering data originally targeted for the mobile communications network. In a non-seamless WLAN offload for a user, the user's payload session is not anchored to the packet core network of the mobile communications network, but offloaded directly from a WI-FI access controller to the Border Network Gateway, BNG.

FIG. 1 shows an example of a non-seamless WLAN offload architecture for an integrated WI-FI solution. A user entity 10, which can be a subscriber of the mobile communications network 20, but which does not need to be a subscriber, also connects to a WI-FI access point 30, which is connected to a WI-FI access control 31 and to a border network gateway 32. A web portal 33 is provided which is used for the access to the WI-FI network. A user may have to input a user name and a password to have access to the WI-FI network. A lawful interception intercept management system (LI-IMS) 40 is provided, which controls lawful interception. A WI-FI Authentication, Authorization and Account (AAA) unit 34 is provided. In the integrated network architecture, the WI-FI AAA 34 is connected to the Home Location Register, HLR, 21 or Home Subscriber Server, HSS, 22. Data packets of a data packet session from a network such as internet 50 is transmitted to the BNG 32.

For users which connect and authenticate to the WI-FI network with a 3GPP identity such as MSISDN (Mobile Station Integrated Service Digital Network Number) or IMSI (International Mobile Subscriber Identity), the LI-IMS 40 uses those identities to send interception requests for a target, a 3GPP identity representing an identity used by the mobile communications network to identify a subscriber. For users which connect and authenticate to the WI-FI network using any Network Access Identifier, NAI, a value based on RFC 4282, e.g. an email ID, the LI-IMS 40 can use the MAC (Media Access Control) address of the user entity, the IP address of the user entity or a user name to send interception requests.

Interception points are the BNG 32 and the WI-FI AAA 34. The WI-FI AAA maps the user's device MAC address and the IP address of the user entity 10 with an identity with which the user accesses the WI-FI network, which is a non-3GPP identity, such as the user name. The non-3GPP identity is an identity which is not used by the mobile communication network to identify a subscriber in the network. The LI-IMS 40 can trigger the lawful interception based on either the user name, such as xxx.yyy@zzz.com, the IP address of the user entity or the MAC address of the user entity.

The LI-IMS 40 looks up a mapped Acct session ID against the target MAC address of the user entity, the IP address of the user entity or the user name and sends a lawful interception request to the RADIUS client, which is the BNG 32. This situation is also shown in further detail in a message exchange flow shown in FIGS. 2a and 2b.

The different steps shown in FIGS. 2a and 2b are self-explaining and are not all explained in detail. As shown in step 26, the LI-IMS 40 binds the network access identifier such as the user name with the MAC address, the IP address of the user entity and the Acct (Accounting)-Session-ID. When an operator or agent of the LI-IMS 40 wants to execute a lawful interception for a certain user, the email address such as xxx.yyy@zzz.com, the IP address or the MAC address is used to identify the user or user entity for which the lawful interception should be carried out. The LI-IMS 40 then checks the RADIUS client managing the user name, IP address or MAC address, looks up the mapped Acct session IDs and triggers the lawful interception to the client by sending an LI request to the BNG, which then confirms the activation of the lawful interception (steps 29-31). When a system as shown in FIG. 1 is upgraded, i.e. when the mobile communications network is upgraded and provides a packet core network and thus provides a packet core network access, the data packet sessions of users are anchored to the packet core from a Trusted Wireless Access Gateway, TWAG, which replaces the BNG to allow anchoring of the data packet sessions of users to the packet core/PDN GW. The PDN gateway or TWAG are then used as interception point with payload knowledge. In the LI-IMS, a target user has to be identified using a 3GPP identity, meaning an identity that is used in the mobile communications network to identify a subscriber, such as the MSISDN or the IMSI. IMEI (International Mobile Equipment Identity) is also a possible value that can be used by the LI-IMS as a target identifier for packet core lawful interception, but the IMEI value is not shared by the mobile user entity when connecting to the WI-FI network as described in 3GPP TS 23.402. Lawful interception is started as soon as the user's GTP (General Packet Radio Service Tunneling Protocol) session is set up between the TWAG and the PDN gateway for the target user or lawful interception could be started for an active GTP session. In such a situation, the LI-IMS cannot send an LI request to the PDN gateway, as a mobile subscriber identity used in the mobile communications network has to be used. Thus, in this situation a lawful interception is not possible.

Thus, a need exists to provide a possibility for a lawful interception when a mobile user entity uses a packet core network of a mobile communications network and when a data packet session is transmitted to the mobile user entity via a wireless access network such as WI-FI or WLAN network and wherein the user entity is identified by the wireless access network using an identity which is not used by the mobile communications network to identify the user entity.

SUMMARY

This need is met by the features of the independent claims. Further embodiments are described in the dependent claims.

According to a first aspect, a method is provided by an authentication unit of a wireless access network to allow anchoring of a data packet session of a user entity connected to the wireless access network to a packet core network of a mobile communications network, wherein the user entity uses an access identifier allowing the user entity to be identified in the wireless access network, wherein the access identifier is not used in the mobile communications network to identify a subscriber. According to one step, a request message is received in which access to the wireless access network is requested wherein the request message contains a MAC address of the requesting user entity. The MAC address in the received request message is then converted into a sequence of digits used as a mobile subscriber identifier with which the user entity is identified in the mobile communications network. Furthermore, a response message accepting the access to the packet core network is transmitted, the response message including the sequence of digits used as mobile subscriber identifier.

As the MAC address of a user entity is known by the authentication unit before the authentication unit authorizes the user session to be anchored to the packet core network, the MAC address of the user entity can be used as a target identity for a lawful interception for users that connect to wireless access networks such as a WI-FI network and which use an identifier for authentication which is not used by a mobile communications network comprising the packet core network.

This method has the advantage that no modification is required for the GTP stack and as a consequence, no modification is required on the TWAG or PDN gateway. Furthermore, the interface between the LI-IMS and the PDN gateway need not to be modified.

The request message may be received from a wireless access gateway and the response message may also be transmitted back to the wireless access gateway.

The invention furthermore relates to an authentication unit configured to allow the anchoring of the packet data session in the above-mentioned situation, the authentication unit comprising a receiver configured to receive the request in which access to the wireless access network is requested, the request message containing the MAC address of the requesting user entity. The authentication unit comprises a converting unit configured to convert the MAC address in the received request message into a sequence of digits used as a mobile subscriber identifier with which the user entity is identified in the mobile communications network. Furthermore, a transmitter is provided configured to transmit a response message accepting the access to the packet core network, wherein the response message includes the sequence of digits used as mobile subscriber identifier.

According to a further aspect, a lawful interception control module is provided configured to collect communication data of user entities in a mobile communications network which comprises a packet core network. The control module comprises an input unit configured for an input of an identifier with which a user entity is identified, the communication data of which should be collected. The input unit is configured for an input of an identifier having a format of an MAC address of the user entity. The lawful interception control module also contains a converting unit configured to convert the input identifier into a sequence of digits used as a mobile subscriber identifier with which the user entity is identified in the mobile communications network. The lawful interception control module furthermore comprises a transmitted configured to transmit the generated sequence of digits as a mobile subscriber identifier to a PDN gateway of the mobile communications network.

BRIEF DESCRIPTION OF THE DRAWINGS

FIG. 7 shows different tables indicating the format of identifiers used in the mobile communications network to identify a subscriber.

DETAILED DESCRIPTION

In the following, embodiments are discussed in more detail in which a user entity connected to a wireless access network such as a WI-FI network requests a data packet session, wherein in an offload situation the data packet session is anchored to a packet core network of a mobile communications network. The user entity uses an identifier to access the WI-FI network which is an identity that is not used in the access network of the mobile communications network. Thus, the wireless access network is also called non 3GPP access network. The radio access part of the mobile communications network is also called 3GPP access network. The identity used in the mobile communications network to identify a subscriber is also named 3GPP identity herein after.

The invention is especially helpful in a lawful interception request in which the traffic transmitted from and to a certain user entity should be monitored by the Lawful Interception Intercept Management System (LI-IMS). As will be explained below, the MAC (Media Access Control) address of the mobile user, which is a unique number for each mobile or non-mobile but WI-FI enabled device, is converted into a sequence of digits used as a mobile subscriber identifier such as the IMSI (International Mobile Subscriber Identity) or the MSISDN (Mobile Station Integrated Services Digital Network Number). The MAC address of the user entity is known by an authentication unit of the WI-FI network, the authentication unit being an Authentication Authorization and Accounting (AAA) unit for the WI-FI network. The authentication unit authorizes the user's data packet session to be anchored to the packet core network when the MAC address is known. Although the MAC address of the user entity is not shared over the GTP (General Packet Radio Service Tunneling Protocol) session to the PDN gateway, the present invention can help the LI-IMS system to use the MAC address of the user entity as target entity for the lawful interception for users that connect to the WI-FI network and use a non-3GPP identity, i.e. an identity that is not used in the cellular network or mobile communication, to authenticate to the WI-FI network, the pending session being anchored to the packet core network of the mobile communications network.

Figure 3:
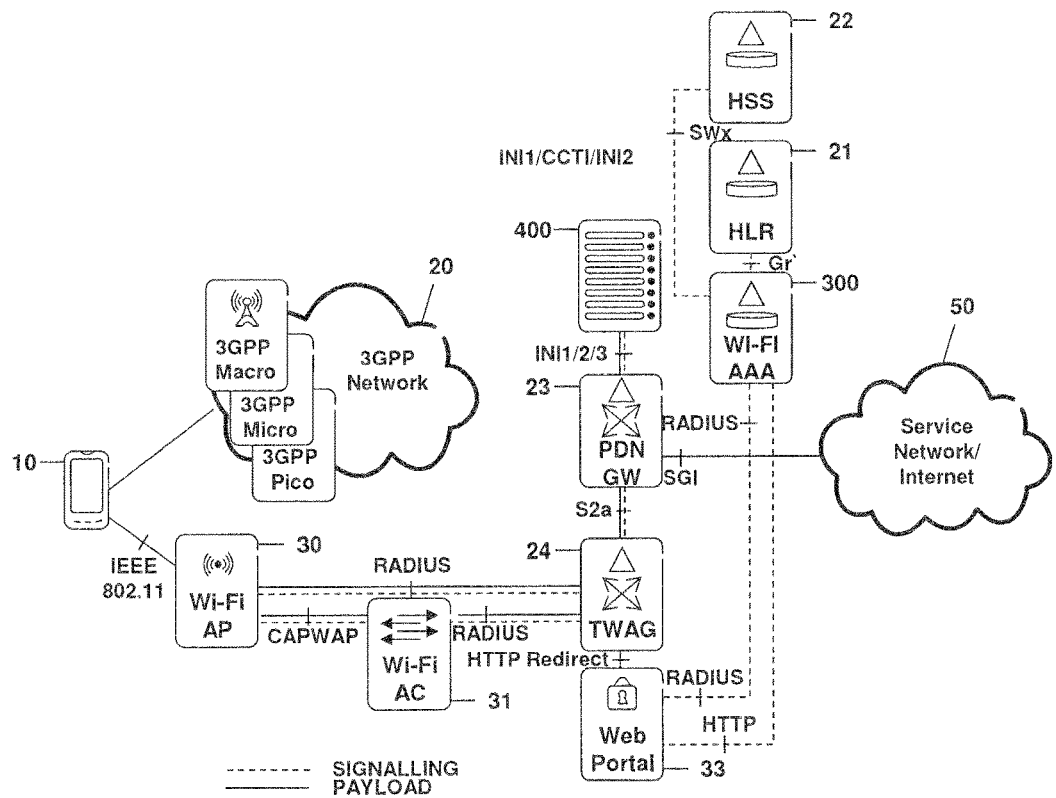
FIG. 3 schematically illustrates a network architecture for a user accessing a packet core network via a WLAN access when using the PDN gateway as gateway for service access.

In connection with FIG. 3, the architecture is schematically shown when a user entity such as a mobile user entity accesses the evolved packet core as a packet core network via the WLAN network, a PDN (Packet Data Network) gateway 23 being used as a gateway for service access.

Figure 1:
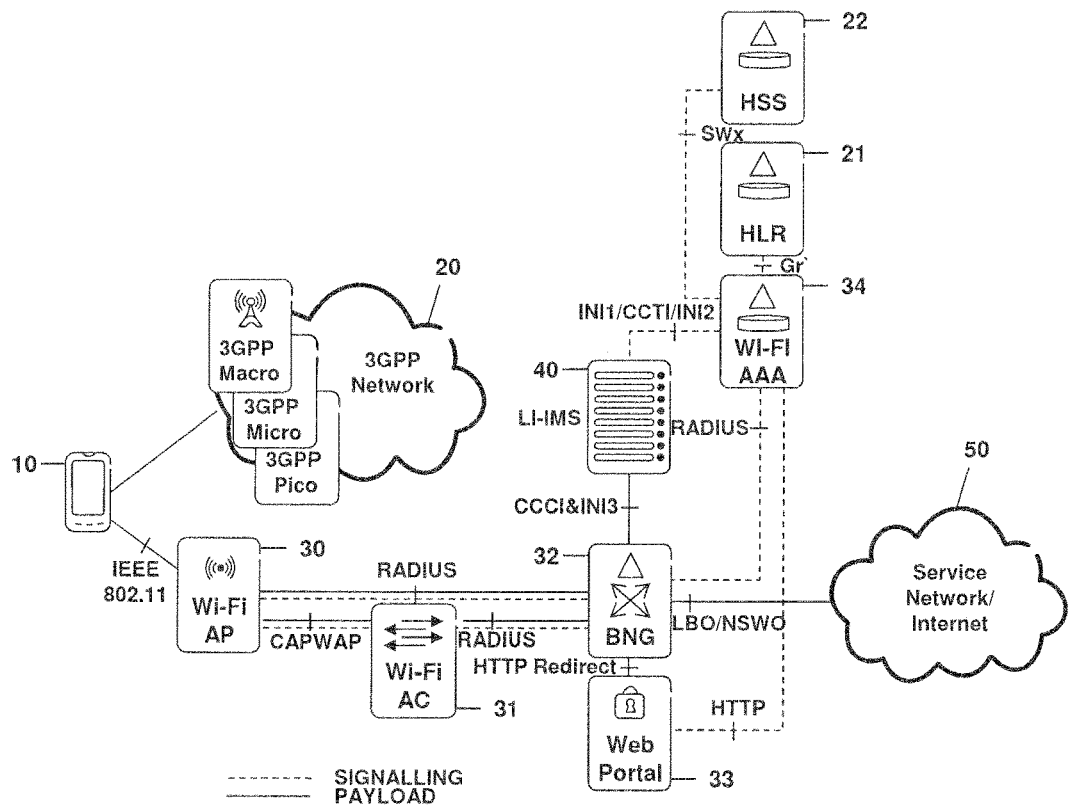
FIG. 1 schematically illustrates an architecture for a non-seamless WLAN offload when using BNG as gateway for service access.
Figure 2A:
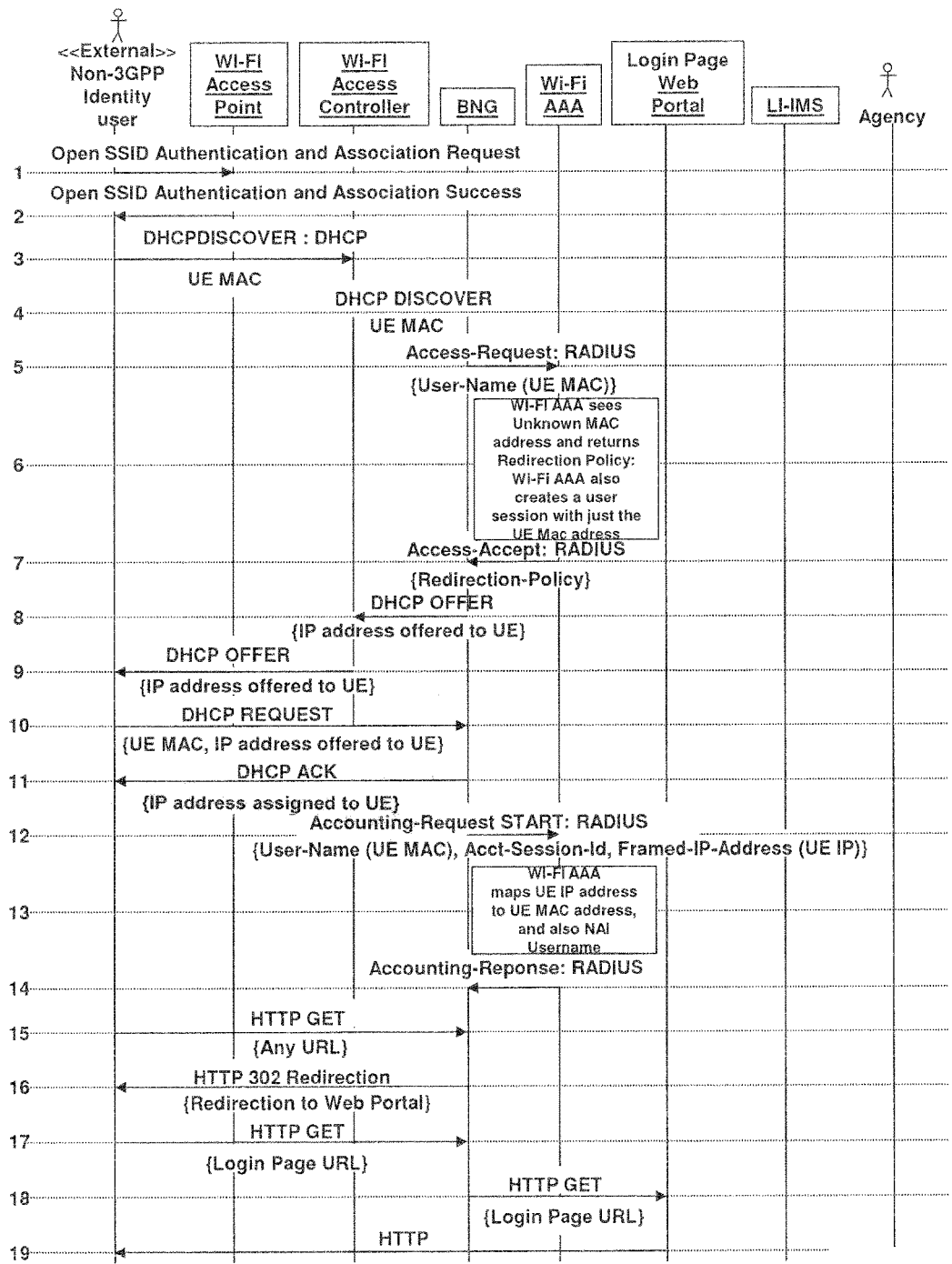
FIG. 2 shows a signaling diagram for a situation of a lawful interception for the embodiment shown in FIG. 1.
Figure 2B:
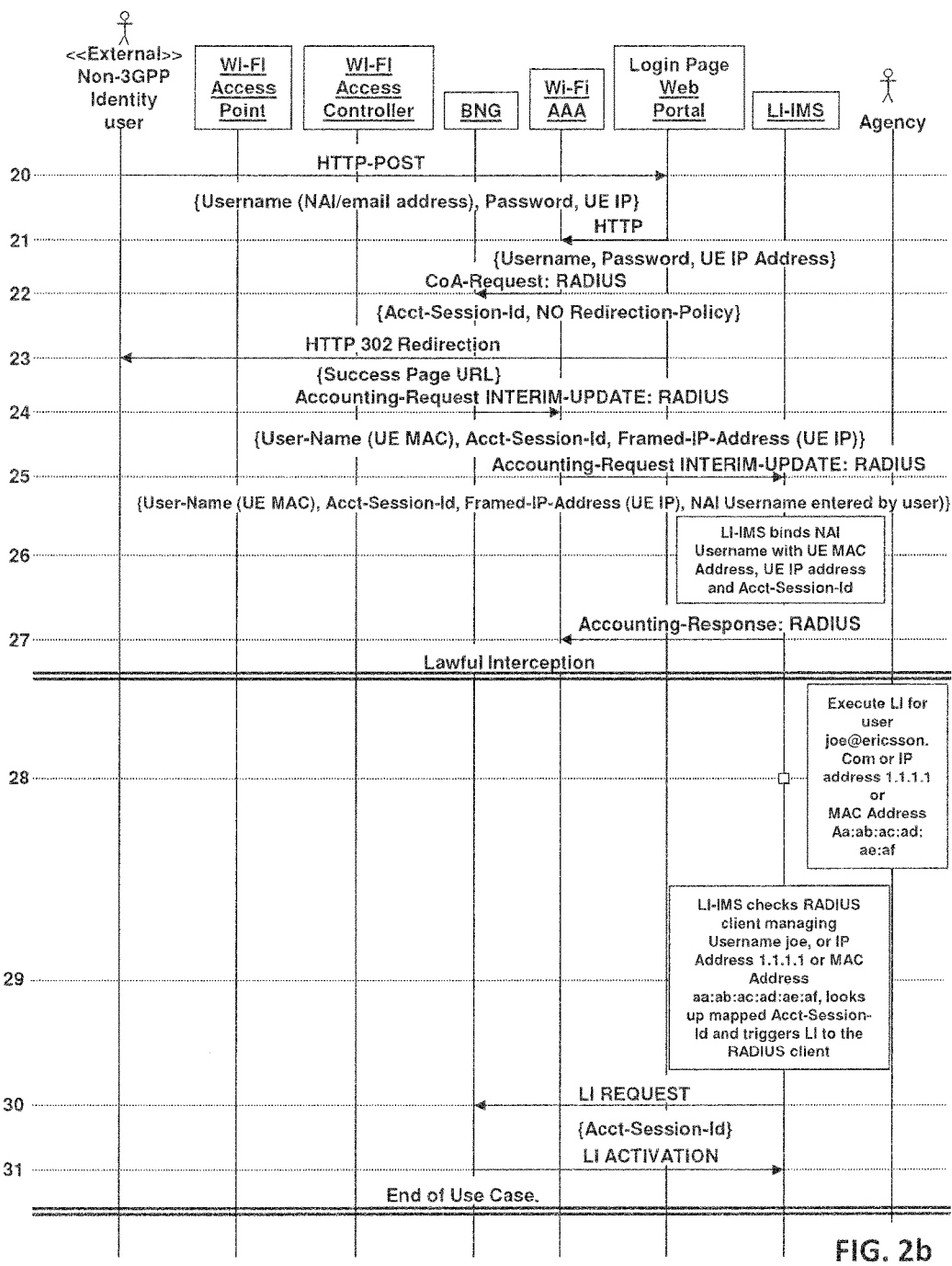

In FIG. 3, the units having the same reference numerals as the units shown in FIG. 1 correspond to the units shown in FIG. 1 and are not explained in detail anymore. When the mobile user entity 10 accesses a WI-FI network through the WI-FI access point 30 and the WI-FI access control 31, the data packet session is attaching to the packet core network via PDN gateway 23. The lawful interception for the user equipment 10 in the 3 GPP packet core is based on the concept that the PDN gateway 23 activates a lawful interception request as soon as the target user, here mobile user entity 10, attaches to the packet core network, meaning that a PDN connection is set up between the TWAG 24 (Trusted Wireless Access Gateway) and PDN gateway 23. A subscriber of the mobile communications network, the core network of which is used by the mobile user entity, uses a 3GPP identity like the MSISDN or IMSI. LI-IMS 400 for the packet core works on the concept of accepting using the 3GPP identity as will be explained below. Authentication unit 300 provides authentication, authorization and accounting for the WI-FI network.

A mobile user entity accessing the WI-FI network and the packet core using a non-3GPP identity to access to the WI-FI network can anchor the payload session to the packet core and the LI-IMS 400 will be able to monitor the session. In an embodiment where a WI-FI solution is used in combination with a packet core network, the user's payload session is anchored to the packet core from the TWAG 24. The PDN gateway 23 or the TWAG 24 are then used as interception point with the payload knowledge.

The target user for the mobile interception has to be identified using a 3GPP identity like MSISDN or IMSI. IMEI (International Mobile Equipment Identity) is also a possible value that can be used by the LI-IMS 400 as a target identifier for packet core lawful interception but IMEI value is not shared by the user entity 10 when connecting to the WI-FI network as described inter alia in 3GPP TS 23.402. Lawful interception is started as soon as the user's GTP session is set up between the TWAG 24 and the PDN gateway 23 for the target user.

For a better understanding of the invention we will first of all explain an embodiment in which the lawful interception is not possible for a mobile user using an identifier in the WI-FI network that is not used in the cellular network, i.e. a non-3GPP identity. Such an embodiment is discussed in connection with FIGS. 4a and 4b. In FIGS. 5 and 6, solutions are explained in more detail which help to successfully carry out a lawful interception for user entities that access a packet core network via a WI-FI access network using a non-3GPP identity.

Figure 4A:
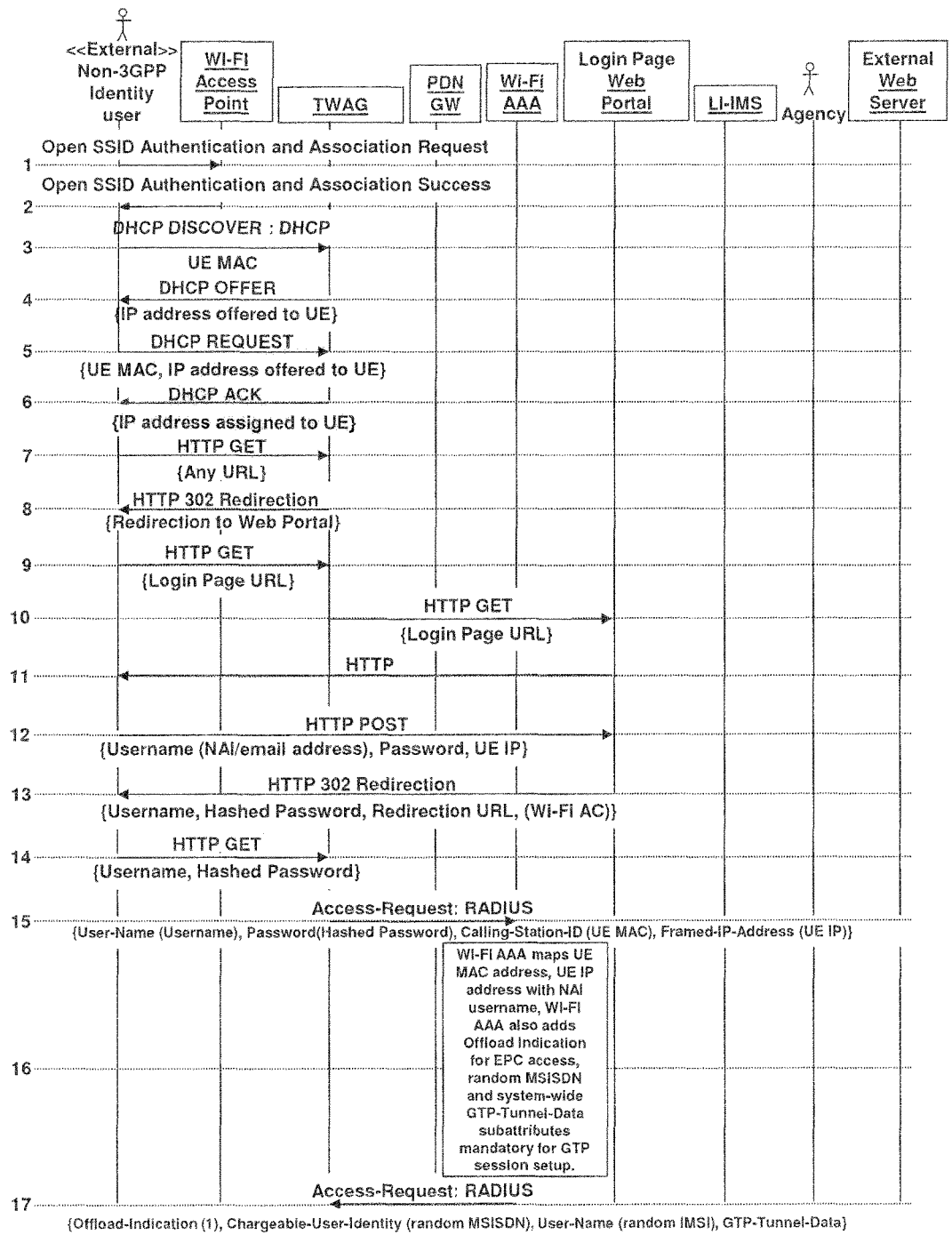
FIGS. 4a and 4b show a signaling diagram for illustrating a failing of a lawful interception as the user entity is identified in the WLAN access via an identifier that is not used to identify a subscriber in the mobile communications network to which the user entity connects.

In step 1 of FIG. 4a, the user entity sends a Service Set Identification (SSID) request to the WI-FI access point 30 in which authentication and association is requested, the service set describing the user entity 10 in a wireless network such as WI-FI or WLAN (Wireless Local Area Network). The response message is sent back from the access point to the user entity in step 2. In step 3, the user then initiates a DHCP (Dynamic Host Configuration Protocol) discover to the TWAG including the user entity's MAC address. In step 4, the TWAG 24 responds with a DHCP offer including an IP address offered to the user entity. In step 5, the user entity sends a DHCP request to the TWAG 24 including the user entity's MAC address and the IP address that was offered to the user entity 4, the TWAG 24 acknowledging the request with the IP address being finally assigned to the user entity (step 6).

In step 7, the user entity sends a request for a certain website to the TWAG, the TWAG responding with a redirection message redirecting the user entity 2 to a login web portal of the WI-FI network (step 8). The login web portal entity is presented to the user on the browser. The login data input by the user entity in step 9 are directed from the TWAG 24 to the web portal (step 10). The webpage is then transmitted in step 11 to the user entity, the user entity entering a user name, i.e. a Network Access Identifier (NAI) or email address and a password, the IP address also being transmitted to the webpage (step 12). The web portal transmits a redirection message to the user entity with redirection URL (step 13). The user entity enters a user name and a password, the information being transmitted to the TWAG 24 in step 14. The TWAG initiates a RADIUS access request towards the WI-FI authentication unit including the user name, a password and the MAC address of the user entity as calling station ID and the IP address of the user entity. As indicated in step 16, the WI-FI AAA maps the MAC address and the IP address with the entity's user name and also adds offload indication for EPC access using a random IMSI and MSISDN. In step 17, the WI-FI AAA 300 informs the TWAG that the access request is accepted including a randomly selected MSISDN and a randomly selected IMSI.

In step 18, a GTP (General Packet Radio Service Tunneling Protocol) session request is transmitted to PDN gateway 23, the latter answering in step 19 with the session response message, which is redirected to the user entity in step 20. In step 21, the user entity queries the URL. In step 22, the WI-FI access control can perform a network access translation of the IP address it had offered in steps 6-8 against the IP address offered by the PDN gateway in step 22. Alternatively, the access control and the PDN gateway can also request the IP address from the AAA unit so that the same IP address is returned by them. In step 23, the requested URL is transmitted to the PDN gateway which then accesses the webserver (step 23 and 24). In steps 25 and 26, a lawful interception occurs, however, the LI-IMS cannot send the lawful interception request to the PDN gateway, as a 3GPP identity has to be used in the LI-IMS and as an identifier was used by the user which is not used by the cellular network.

The solution for this problem is discussed in more detail in a first scenario described in connection with FIGS. 5a-5c. In this embodiment, the user name and the password of the user entity is known and the user entity already has an IP address.

Figure 6A:
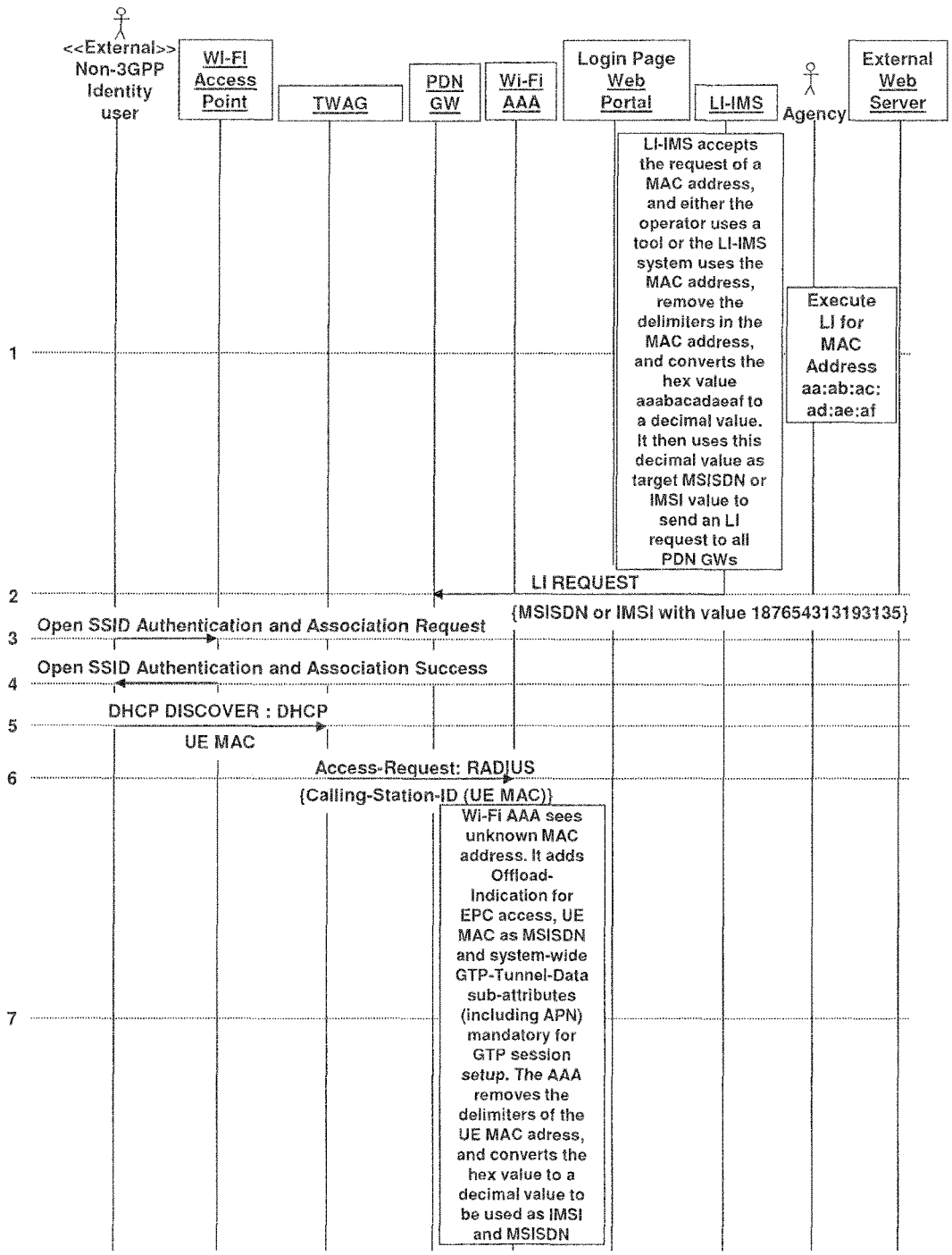
FIG. 6 shows another signaling diagram for illustrating a successful lawful interception for the architecture of FIG. 3.
Figure 6B:
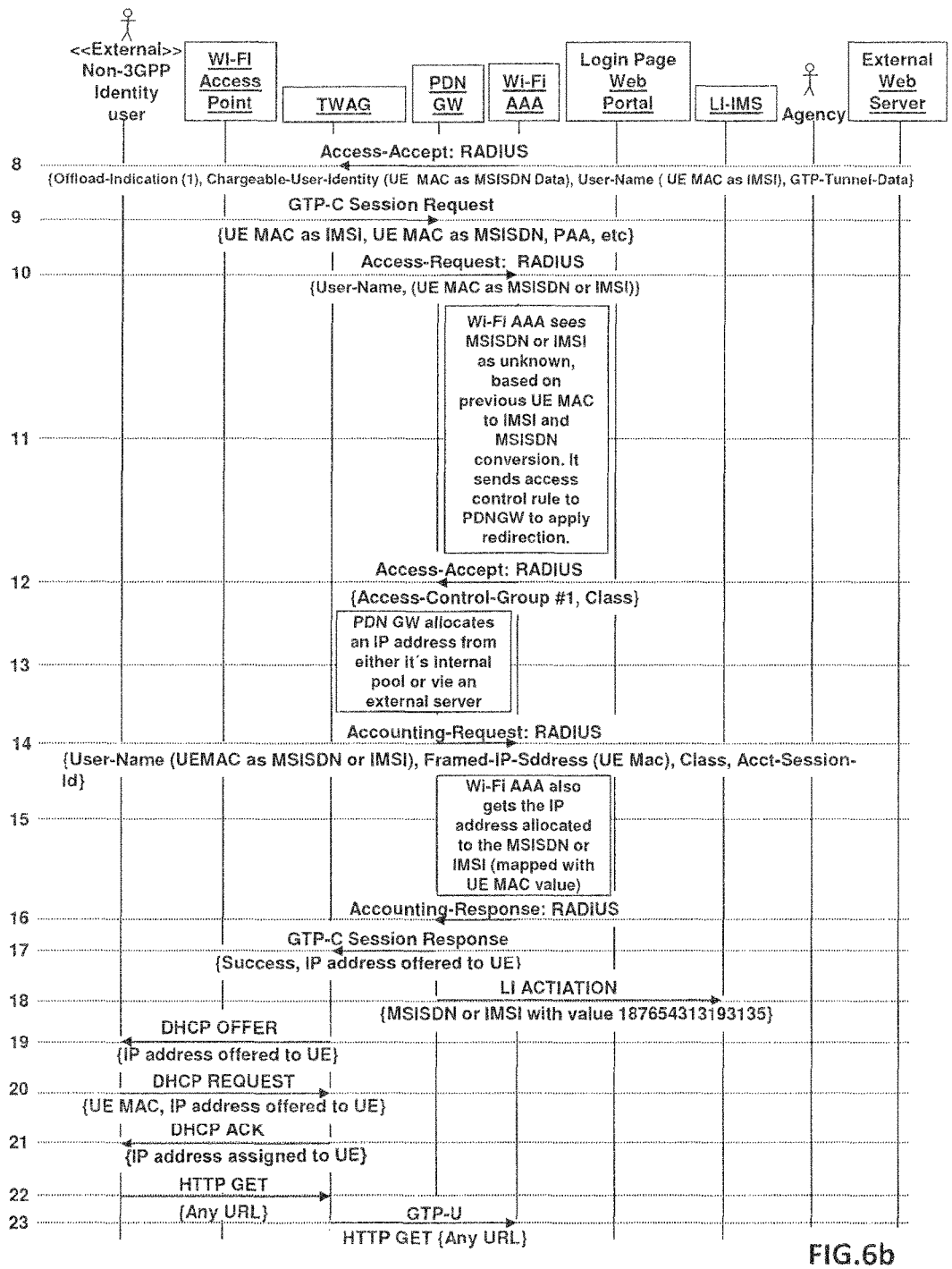
Figure 6C:
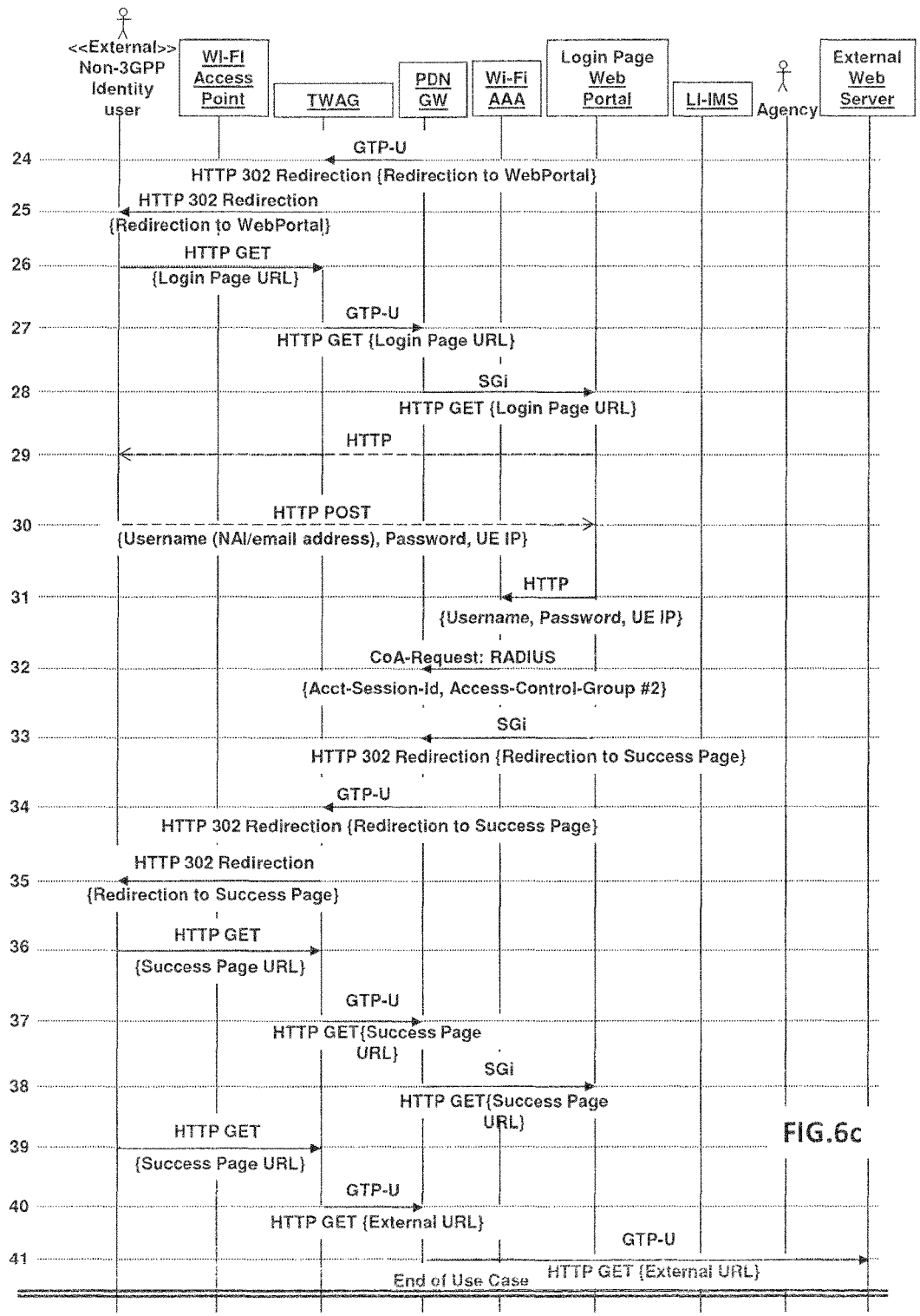

In connection with FIGS. 6a-6c, an embodiment is discussed where the user entity has not yet entered a user name or password and no IP address has been assigned yet to the user entity.

In both embodiments, the authentication unit 400 will convert the known MAC address into a sequence of digits used as a mobile subscriber identifier with which the user entity can be identified in the mobile communications network. In both embodiments, the operator of the LI-IMS 400 can execute a lawful interception using the MAC address of the user entity. As can be seen in step 1 of FIG. 5a, the LI-IMS accepts the request of a MAC address and the LI-IMS system is capable of converting the MAC address into an MSISDN or an IMSI by removing the delimiters in the MAC address and by converting the hex value of the MAC address by the operator into a decimal value. The LI-IMS 400 then uses this decimal value as a target MSISDN or IMSI value to send the lawful interception request to the PDN gateways. As can be seen in step 2, the lawful interception request is sent to the PDN gateway with the MAC address being converted into an MSISDN or IMSI.

In the embodiment shown in FIG. 5b, steps 3-17 correspond to steps 1-15 as discussed in connection with FIG. 4a and will not be explained in detail anymore. Referring to step 16, when the TWAG gets an HTTP message from the UE with the user name and the password, the TWAG authenticates the user towards the authorization unit, the WI-FI AAA. The MAC address of the user entity is shared by the TWAG with the WI-FI AAA using any standard RADIUS attribute like calling station ID as shown in step 17. When the authorization unit 300 in step 18 authorizes the user based on the user name the user had entered on the web portal in step 14, the authorization unit AAA authorizes the user's payload to be anchored to the packet core. As part of this authorization, the authorization unit 300, instead of adding a random IMSI in the user name RADIUS attribute and a random MSISDN, adds the UE MAC address as MSISDN and IMSI values. As shown in step 18, the WI-FI AAA maps the MAC address and the IP address with the user name. The authorization unit furthermore adds the offload indication for the packet core access and the MAC address is used as IMSI and MSISDN. Furthermore, systemwide GTP tunnel data sub attributes mandatory for the GTP session setup are added. For the conversion, the authorization unit removes the delimiters of the MAC address and converts the hex values to a decimal value that is used as IMSI and MSISDN.

Figure 4B:
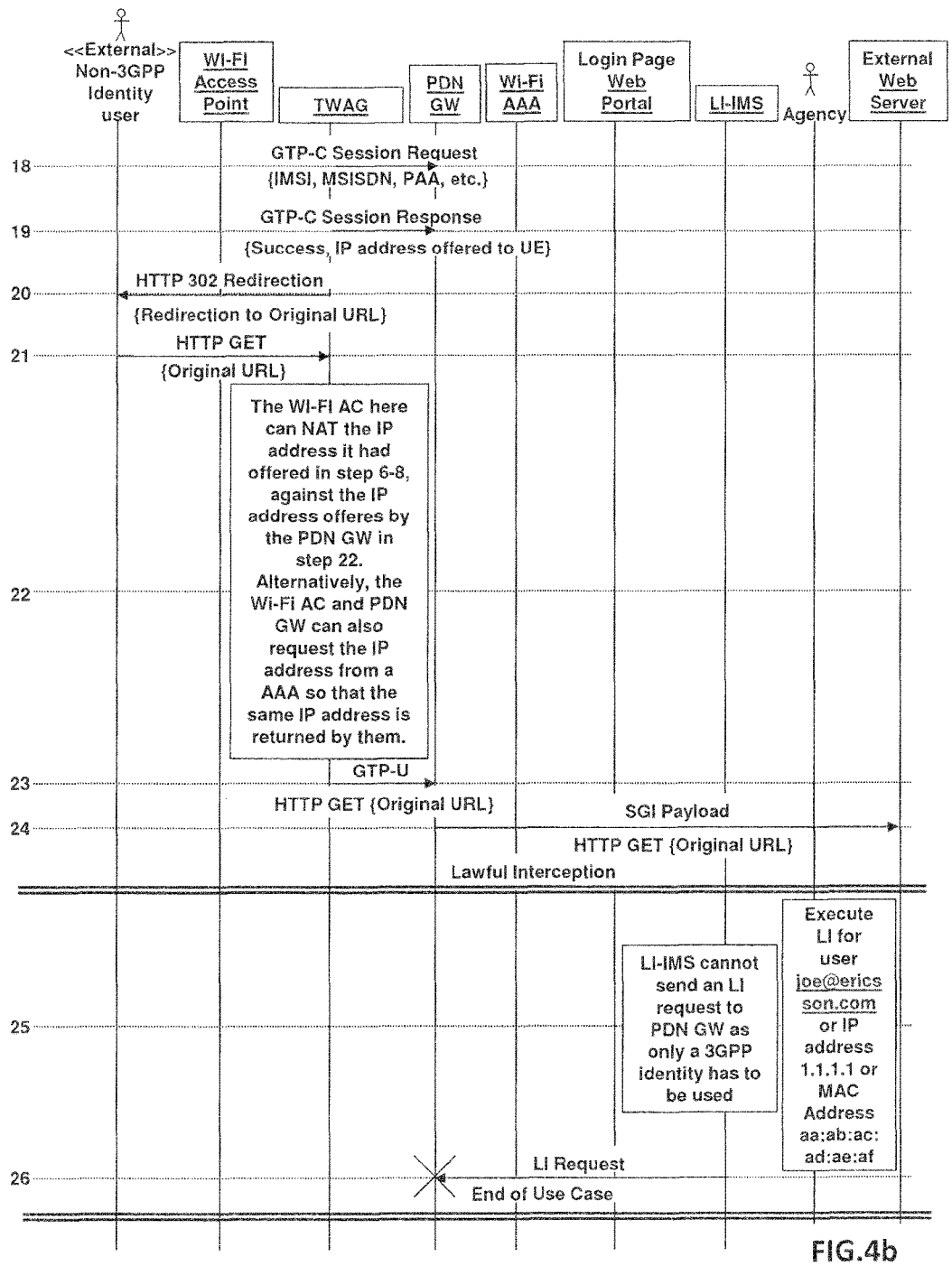
Figure 5A:
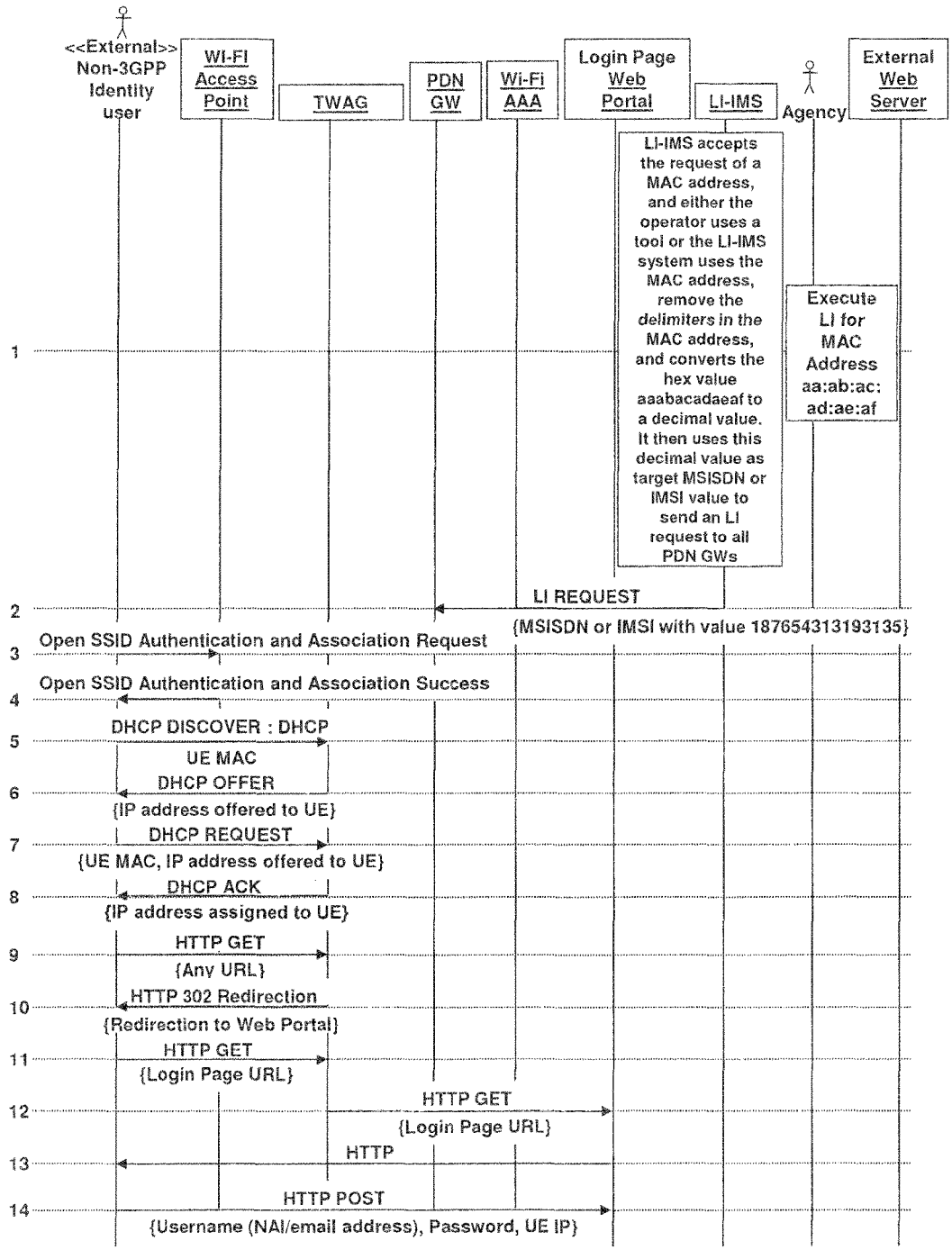
FIG. 5 shows a signaling diagram for a successful lawful interception for the architecture shown in FIG. 3.
Figure 5B:
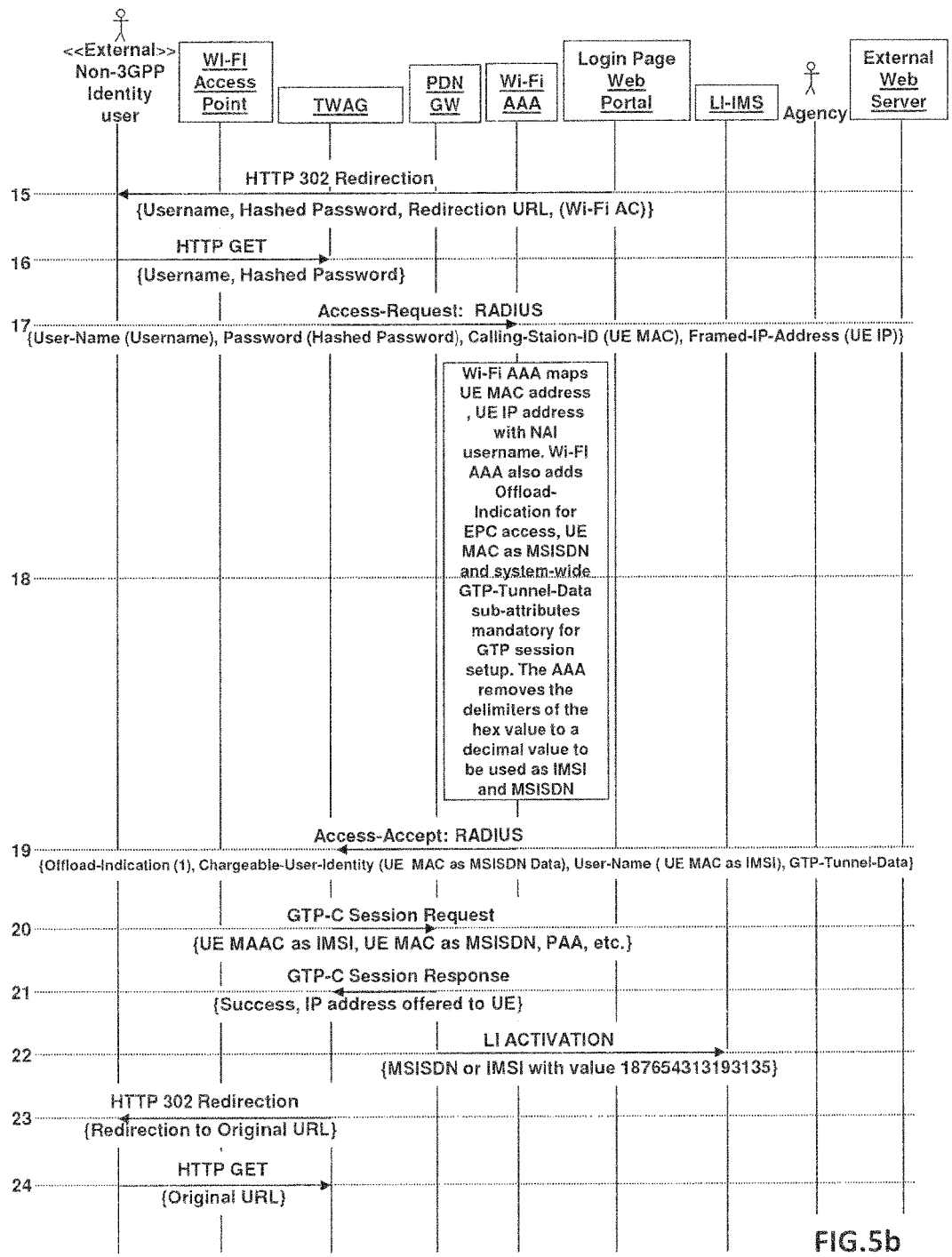

Steps 19-21 in FIG. 5b correspond to steps 17-19 of FIG. 4b. In step 22, the PDN gateway informs the LI-IMS of the LI activation including the MAC address that was converted into the MSISDN or IMSI. Steps 23 and 24 correspond to steps 20 and 21 of FIG. 4b.

Step 25 corresponds to step 22 and step 26 and 27 correspond to steps 23 and 24 of FIG. 4b.

Figure 5C:
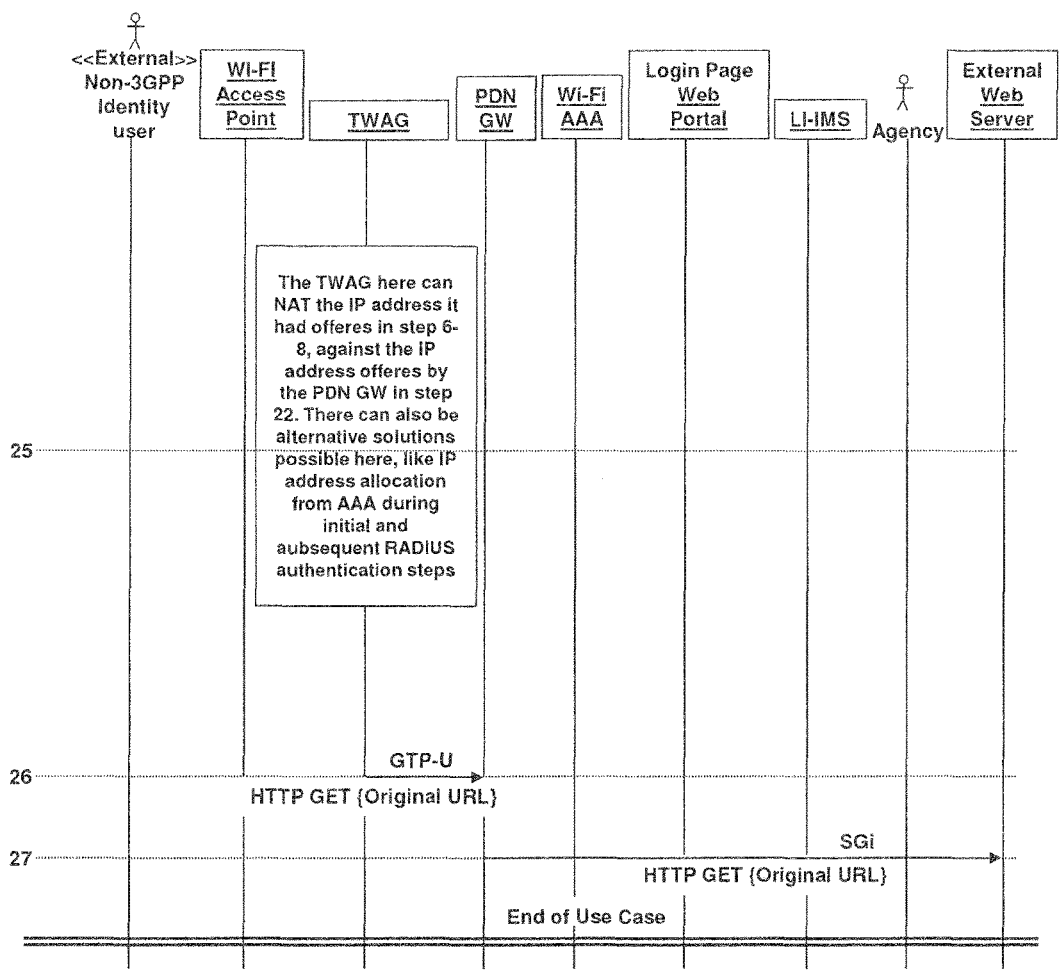

In summary, as can be deduced from FIGS. 5a-5c with the conversion of the MAC address into a 3GPP identity, a mobile user entity which accesses the WI-FI network with a non-3GPP entity can be monitored and a lawful interception can be carried out successfully.

In the embodiment described above, a web portal authentication was used to authenticate the user via the WLAN to the core network. However, any other authentication method can be used that may not contain a 3GPP identity input by the user and where the MAC address of the user entity can be used to identify the user entity in the packet core. Also, such authentication methods could include EAP-TLS (Extensible Authentication Protocol-Transport Layer Security), EAP-TTLS (Extensible Authentication Protocol-Tunneled Transport Layer Security), EAP-PEAP (Extensible Authentication Protocol-Protected Extension Authentication Protocol).

From the above discussion of FIGS. 5a-5c, some general features can be concluded. By way of example, as can be seen from step 15, the received request message, in addition to the MAC address, contains an authentication of the user entity. In another embodiment disclosed below, the received request message is an authentication request requesting authentication of the user entity.

Furthermore, in one embodiment the step of converting the MAC address into a sequence of digits comprises the step of removing delimiters contained in the MAC address before the MAC address is converted into the sequence of digits. Additionally, the converting step can comprise the step of converting hexadecimal values contained in the MAC address into decimal values contained in the sequence of digits.

Furthermore, it can be deduced that the sequence of digits is transmitted in the response message by the authentication unit, the WI-FI AAA, as IMSI of the user entity and as MSISDN of the user entity.

In another embodiment, it is possible that an offload indicator is added to the transmitted response message, and the offload indicator indicates an offload situation in which the data packet session which could be transmitted to the user entity via an access network of the mobile communications network is transmitted to the user entity through the wireless access network, here the WI-FI network.

Furthermore, it may be deduced from the above discussion that the request message is received from a wireless access gateway, wherein the response message is transmitted back to this wireless access gateway.

In the flow discussed below in connection with FIG. 6, the TWAG sees an unknown MAC address in a DHCP message and it triggers a RADIUS authentication request towards the authentication unit of the WI-FI access network. In this authentication request, the MAC address of the user entity is shared by the TWAG with the authentication unit using any standard RADIUS attribute like a calling station ID. As the default behavior of the authentication unit is to anchor all sessions to the packet core, the WI-FI AAA adds the IMSI and the MSISDN along with the offload indication and GTP tunnel data to inform the TWAG to set up the GTP session. As the MAC address is unknown, the WI-FI AAA adds the UE MAC address and the user name's RADIUS attribute emulating the IMSI and the MAC address in the Chargeable-User-Identity RADIUS attribute emulating the MSISDN instead of adding a random IMSI or a random MSISDN value.

Referring in more detail to FIG. 6a, steps 1-4 correspond to steps 1-4 of FIG. 5a.

In step 5 of FIG. 6a, the user equipment sends a DHCP discover message to the TWAG including the MAC address. The TWAG detects this as an unknown MAC address and triggers a RADIUS authentication request to the WI-FI AAA (step 6). The AAA then sees an unknown MAC address and adds the offload indication for the evolved packet core access. Furthermore, it uses the MAC address of the user entity (UE) as IMSI and MSISDN and adds systemwide GTP tunnel data sub attributes mandatory for the GTP session setup. For generating the MSISDN or IMSI, the delimiters of the MAC address are removed and the hex value is converted to a decimal value (step 7).

In step 8, the authentication unit informs the TWAG that the access request is accepted including the converted UE MAC. In steps 9 and 10, the session request message including the MAC address as IMSI and MSISDN is transmitted from the TWAG via the PDN gateway to the authentication unit. In step 11, the authentication unit detects an unknown subscriber and thus sends an access control rule to the PDN gateway in step 12 to apply for redirection. In step 13, the PDN gateway allocates an IP address from either its internal pool or via an external server and transmits an accounting request RADIUS message to the WI-FI AAA in step 14.

In step 15, the WI-FI AAA also gets the IP address allocated to the MSISDN or IMSI and transmits an accounting response in step 16 to the PDN gateway, the GTP session response being transmitted in step 17 to the TWAG. The PDN gateway then informs the LI-IMS of the LI activation including the converted sequence of digits in which the MAC address was converted into an identifier allowing to identify the user entity in the mobile communications network.

Steps 19-22 correspond to steps 4-7 of FIG. 4a. In step 23, the requested URL is transmitted from the TWAG to the PDN gateway which answers with a redirect message in step 24. The PDN gateway sends a HTTP 302 redirect message to the TWAG, which is then transmitted to the user entity in step 25. The user entity in step 26 queries the URL which is transmitted from the TWAG to the web portal in steps 27 and 28. The web portal login is then presented to the user in step 29, the user entity/user entering a user name and password (step 30). The user name and the password together with the IP address are transmitted from the web portal to the WI-FI AAA in step 31. The AAA server initiates a RADIUS CoA (Change of Authorization) request to the gateway, the portal sending a HTTP 302 redirection message to the gateway in step 33, which is then forwarded to the TWAG in step 34 and to the user entity in step 35. In step 36, the URL is queried by the user entity which is transmitted in step 37 and 38 to the web portal. Furthermore, in step 39 the requested URL is input and sent to the TWAG which then transmits the request to the PDN gateway, from where it is transmitted to the external web server (steps 40 and 41). As shown above, even when the TWAG sees an unknown MAC address, a lawful interception is possible.

In FIG. 7, the conversion of the MAC address into an IMSI or MSISDN is discussed in more detail. The format of the IMSI as defined in 3GPP TS 23.003 is shown in the upper table of FIG. 7. In decimal values the IMSI has 15 digits. The format of the MSISDN as specified in 3GPP TS 23.003 is shown in the table in the middle of FIG. 7 and comprises also 15 digits.

The format of the MAC address as defined by IEEE 802-2001 comprises in decimal values 18 digits when used with delimiters. However, when the delimiters of the MAC address are removed, i.e. FFFFFFFFFFFF, the maximum decimal value of the MAC address can have is 281474976710655, when this hex value is converted to a decimal figure, which is 15 digits.

So if the WI-FI AAA can use the MAC address without delimiters and convert it to a decimal value and add the converted value as IMSI in the user name RADIUS attribute and as MSISDN in the Chargeable-User-Identity RADIUS attribute, the TWAG will still see an MSISDN and an IMSI being provided by the WI-FI AAA 300. The GTP session will successfully set up between the TWAG 24 and the PDN gateway 23 and the packet core will have a real identity that is associated with the UE and not any randomly generated IMSI and MSISDN value. The operator can accept the target identifier based on the MAC address and convert the MAC address without delimiters to a decimal value either manually or via a tool incorporated into the LI-IMS. The LI-IMS system can then trigger a lawful interception towards the PDN gateway based on the MSISDN or IMSI without requiring any additional identifier support. The packet core can activate the lawful interception based on the IMSI or MSISDN value received from the LI-IMS system.

There could be cases where the converted MAC decimal value may overlap with the operator's IMSI or MSISDN decimal value ranges. This could cause the system to trigger a lawful interception for an unintended target. There are two main different ways this problem can be solved.

A first possibility to solve this problem is to add a logic in the AAA, e.g. in the converting unit after AAA and into the LI-IMS or the converting unit of the LI-IMS the following feature: If the authentication unit sees any MAC address matching a predefined IMSI or MSISDN range, it may increase the MAC value beyond the maximum MAC decimal value of 281474976710655, but would of course not overlap the operator's IMSI or MSISDN range.

By way of example, the real IMSI series in the operator is 100000000000000 to 300000000000000, and the MSISDN series in the operator is 120000000000 to 180000000000. The converted MAC returns a value 112233445566778, which overlaps with a real IMSI series. In this case, the AAA increases the value of the converted MAC by a factor of 200000000000000, which changes the value of the converted MAC to 312233445566778. The same behavior can also be implemented in the tool that inputs the target identifier in the LI-IMS. Similarly, for a MAC that overlaps with the real MSISDN series, the AAA and LI-IMS input tool can increase the value of the MAC address by a factor of 500000000000000, which will be more than the value of increased MAC value as well (when overlapping with IMSI series).

In this embodiment, the converting unit of the authentication unit may be configured to check whether the sequence of digits has a value which lies in a predefined range of values. If this is the case, the converting unit changes the sequence of digits in such a way that the value of the changed sequence of values lies outside the predefined range of values.

Another possibility to solve this problem would be that if the LI-IMS system sends multiple lawful interception identities for the same target, it will be easy to differentiate between a real IMSI and an MSISDN. In case of emulated IMSI and MSISDN, the decimal values will remain the same, while in case of a real IMSI and MSISDN, the decimal values will most likely be different.

Hence, if the PDN GW receives an LI request with MSISDN value 123456789 and IMSI value 11223344556677, it can easily differentiate this from a LI request that will contain 11223344556677 for both IMSI and MSISDN values. The PDN GW will activate LI only if both 3GPP identity values provided by the LI-IMS system match, i.e. the IMSI and the MSISDN.

Figure 8:
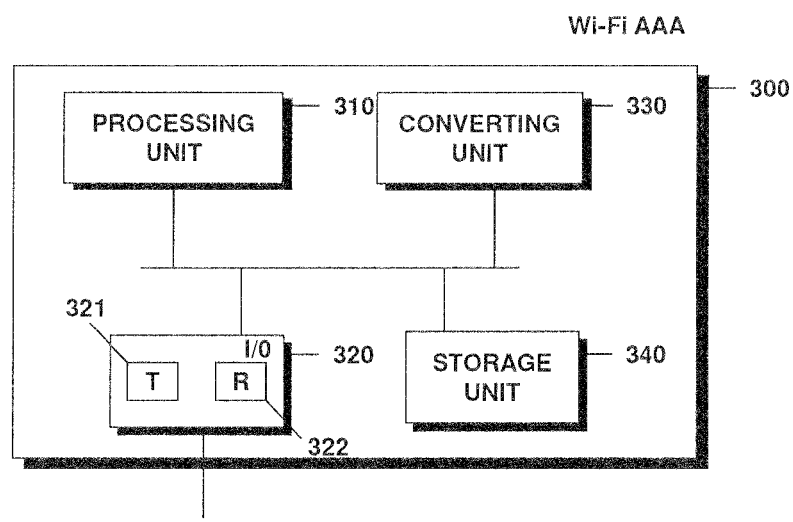
FIG. 8 schematically illustrates an authentication unit which converts a MAC address into a mobile subscriber identifier allowing the user entity to be identified in the mobile communications network.

In connection with FIG. 8, the authentication unit, the WI-FI AAA 300, will be discussed in more detail. The authentication unit comprises a processing unit 310 which can be used to control the functioning of the whole authentication unit. The authentication unit shown in FIG. 8 is configured to convert the MAC address into a network identifier with which the user entity can be identified in the mobile communications network as described above. The authentication unit comprises an input/output unit 320 which can be a device interface for communication with other nodes or devices. Using input/output unit 320, the authentication unit is enabled to transmit data to other entities as symbolized by transmitted 321, the input/output unit comprising a receiver 322 configured to receive messages from outside the authentication unit.

A converting unit 330 is provided, which converts the MAC address into a sequence of digits which is then used as an IMSI and/or MSISDN. The converting unit 330 furthermore comprises a storage unit or memory 340. The storage unit 340 may include a read-only memory, ROM, a RAM, a DRAM or SRAM and a mass storage or the like. The storage unit 340 can include suitably configured program codes to be executed by the processing unit 310 to implement the above-described functionalities.

Figure 9:
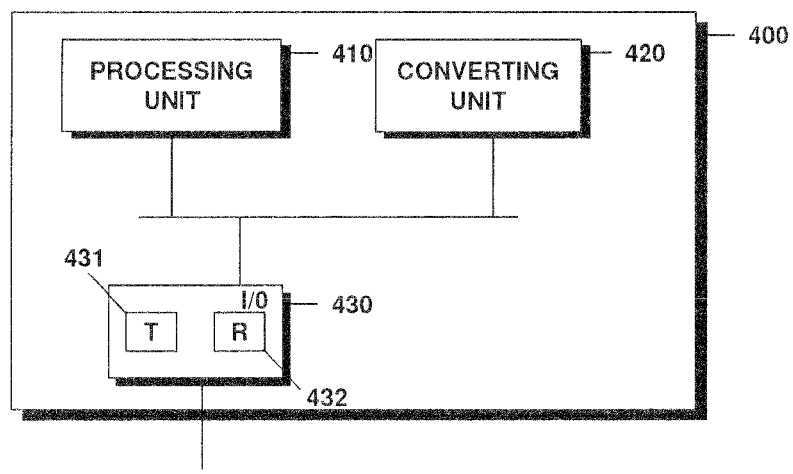
FIG. 9 shows a schematic view of a lawful interception control module which allows an input of a MAC address of the user entity and which converts the address into a subscriber identifier.

FIG. 9 shows a schematic view of the LI-IMS 400. It comprises an input unit via which an agent of the LI-IMS can input a MAC address. The LI-IMS 400 comprises a converting unit 420, which can convert the MAC address into the IMSI value or MSISDN value. An input/output unit 430 is provided, which comprises a transmitter 431 used to transmit data to other entities and the receiver 432 configured to receive data from other entities. By way of example, the LI-IMS may send the converted MAC as target IMSI or MSISDN with an LI request to different PDN gateways.

It should be understood that the structures illustrated in FIGS. 8 and 9 are merely schematic views and that the nodes shown may actually include further components which, for the sake of clarity, have not been illustrated. Furthermore, the different functional features shown in FIGS. 8 and 9 may be incorporated by software, hardware or a combination of software and hardware.

The above-described features may be used in the given context. However, it should be understood that each of the above-described features may be used in connection with any of the other feature or may be used alone.

The above-discussed scenarios have several advantages. First of all, the proposed solution requires no modification to the GTP stack and as a result, no modification is required in the TWAG or PDN gateway. Furthermore, in the above-discussed solution no modification is needed to interface between the LI-IMS and the PDN gateway. A further advantage is that operators that use the MAC address as the LI target identifier can continue using the same identifier for the non-3GPP WI-FI users even if the non-3GPP users payload sessions are anchored to the packet core.

The invention claimed is:

1. A method, performed by an authentication node of a local wireless access network, to establish a data packet session, between a user entity device connected to the local wireless access network and a packet core network of a mobile communications network, the user entity device using an access identifier allowing the user entity device to be identified in the local wireless access network, wherein the access identifier is not used in the mobile communications network to identify a subscriber of the mobile communications network, the method comprising the steps of:
receiving a request message, from a local wireless access gateway of the local wireless access network, in which access to the local wireless access network is requested, wherein the request message contains a Medium Access Control (MAC) address of the requesting user entity device,
converting the MAC address in the received request message into a sequence of digits used as a mobile subscriber identifier with which the user entity device is identified in the mobile communications network,
determining whether the sequence of digits has a value which lies in a predefined range of values,
responsive to a determination the sequence of digits has a value which lies in the predefined range of values, changing the sequence of digits such that the value of the changed sequence of digits lies outside the predefined range of values, and
transmitting, to the local wireless access gateway of the local wireless access network, a response message accepting the request for access to the packet core network, the response message including the changed sequence of digits used as the mobile subscriber identifier in the mobile communications network, wherein the response message triggers the local wireless access gateway to setup the data packet session between the user entity device and the packet core network using the sequence of digits.

2. The method according to claim 1, wherein the step of converting the MAC address comprises the step of removing delimiters contained in the MAC address before the MAC address is converted into the sequence of digits.

3. The method according to claim 1, wherein the step of converting the MAC address comprises the step of converting hexadecimal values contained in the MAC address into decimal values contained in the sequence of digits.

4. The method according to claim 1 wherein the sequence of digits contains 15 digits.

5. The method according to claim 1, wherein the sequence of digits is transmitted in the response message by the authentication unit as an International Mobile Subscriber Identity (IMSI) of the user entity device and as a Mobile Station Integrated Services Digital Network Number (MSISDN) of the user entity device.

6. The method according to claim 1, wherein the received request message, in addition to the MAC address, contains an authentication of the user entity device.

7. The method according to claim 1, wherein the received request message is an authentication request requesting authentication of the user entity device.

8. The method according to claim 1, wherein the wireless access network is a WI-FI network.

9. The method of claim 1, wherein the data packet session comprises a General Packet Radio Service Tunneling Protocol (GTP) tunnel session, and wherein the transmitted response message comprises GTP tunnel data sub attributes required to establish the GTP tunnel session using the sequence of digits.

10. The method of claim 1, wherein the response message comprises an offload indicator that triggers the local wireless access gateway to setup the data packet session between the user entity device and the packet core network using the sequence of digits.

11. The method of claim 1, wherein the predefined range of values comprises a predefined range of IMSI and MSISDN value ranges of the mobile communication network.

12. An authentication node of a local wireless access network configured establish a data packet session, between a user entity device connected to the local wireless access network and a packet core network of a mobile communications network, the user entity device using an access identifier allowing the user entity device to be identified in the local wireless access network, wherein the access identifier is not used in the mobile communications network to identify a subscriber of the mobile communications network, the authentication node further configured to:

receive a request message, from a local wireless access gateway of the local wireless access network, in which access to the local wireless access network is requested, wherein the request message contains a Medium Access Control (MAC) address of the requesting user entity device, convert the MAC address in the received request message into a sequence of digits used as a mobile subscriber identifier with which the user entity device is identified in the mobile communications network, determine whether the sequence of digits has a value which lies in a predefined range of values, responsive to a determination the sequence of digits has a value which lies in the predefined range of values, change the sequence of digits such that the value of the changed sequence of digits lies outside the predefined range of values, transmit, to a local wireless access gateway of the local wireless access network, a response message accepting the request for access to the packet core network, the response message including the changed sequence of digits used as the mobile subscriber identifier in the mobile communications network in the mobile communications network, wherein the response message triggers the local wireless access gateway to setup the data packet session between the user entity device and the packet core network using the changed sequence of digits, and wherein the authentication node comprises processing hardware.

13. The authentication node according to claim 12, wherein the authentication node is further configured to remove delimiters contained in the MAC address before it converts the MAC address into the sequence of digits.

14. The authentication node according to claim 12, wherein the authentication node is further configured to convert hexadecimal values contained in the MAC address into decimal values contained in the sequence of digits.

15. The authentication node according to claim 12, wherein the authentication node is further configured to use the generated sequence of digits as IMSI and as MSISDN of the user entity.

16. The authentication node according to claim 12, wherein the response message comprises an offload indicator that triggers the local wireless access gateway to setup the data packet session between the user entity device and the packet core network using the sequence of digits.

17. The authentication node of claim 12, wherein the data packet session comprises a General Packet Radio Service Tunneling Protocol (GTP) tunnel session, and wherein the transmitted response message comprises GTP tunnel data sub attributes required to establish the GTP tunnel session using the sequence of digits.

18. A lawful interception control node of a lawful interception management system, the lawful interception control node configured to collect communication data of user entity devices in a mobile communications network which comprises a packet core network, the control node further configured to:

receive an input of an identifier of a user entity device and the communication data of the user entity device to be collected, wherein the comprises a Medium Access Control (MAC) address of the user entity device operating in a local area wireless network, convert the input identifier into a sequence of digits used as mobile subscriber identifier with which the user entity device is identified in the mobile communications network, determine whether the sequence of digits has a value which lies in a predefined range of values, responsive to a determination the sequence of digits has a value which lies in the predefined range of values, change the sequence of digits such that the value of the changed sequence of digits lies outside the predefined range of values, transmit the generated changed sequence of digits as a mobile subscriber identifier of the user entity device to all Packet Data Network (PDN) gateways of packet core network of the mobile communications network to trigger establishment of a data packet session between the user entity device and a PDN gateway of the PDN gateways through a local wireless access gateway of the local area wireless network using the changed sequence of digits, intercept the communication data exchanged between the PDN gateway and the user entity device during the established data packet session, and wherein the authentication node comprises processing hardware.

\* \* \* \* \*